United States Patent
Ba'ba' et al.

(10) Patent No.: US 12,517,869 B2
(45) Date of Patent: Jan. 6, 2026

(54) SYSTEMS AND METHODS FOR EXECUTING JUMP-BASED CONTENT-DEFINED DATA CHUNKING

(71) Applicant: Acronis International GmbH, Schaffhausen (CH)

(72) Inventors: Abdelrahman Ba'ba', Waterloo (CA); Sreeharsha Udayashankar, Waterloo (CA); Samer Al-Kiswany, Waterloo (CA); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 160 days.

(21) Appl. No.: 18/477,853

(22) Filed: Sep. 29, 2023

(65) Prior Publication Data

US 2025/0110924 A1    Apr. 3, 2025

(51) Int. Cl.
*G06F 16/174* (2019.01)
(52) U.S. Cl.
CPC .................. *G06F 16/1752* (2019.01)
(58) Field of Classification Search
None
See application file for complete search history.

(56) References Cited

U.S. PATENT DOCUMENTS

| | | | | |
|---|---|---|---|---|
| 8,780,478 | B1* | 7/2014 | Huynh | G11B 5/40 360/78.04 |
| 2005/0273752 | A1* | 12/2005 | Gutberlet | G06F 8/443 716/104 |
| 2008/0133446 | A1* | 6/2008 | Dubnicki | G06F 16/1752 |
| 2008/0310731 | A1* | 12/2008 | Stojancic | G06V 20/40 382/195 |
| 2012/0136842 | A1* | 5/2012 | Zhu | G06F 16/1748 707/E17.005 |
| 2013/0128735 | A1* | 5/2013 | Li | H04L 43/0882 370/230 |
| 2023/0296654 | A1* | 9/2023 | Lu | G01R 22/10 324/141 |

* cited by examiner

*Primary Examiner* — Yu Zhao
(74) *Attorney, Agent, or Firm* — ArentFox Schiff LLP; Michael Fainberg (57) ABSTRACT

Disclosed herein are systems and method for executing jump-based content-defined data chunking. In one aspect, a method may generate, for a byte stream of data, a primary window and a secondary window that overlaps with the primary window. A method may scan the byte stream for data chunks using the primary window and the secondary window, wherein the scanning comprises (a) executing, based on minimum values in the secondary window when shifted along the primary window, a jump mechanism in which the primary window and the secondary window are shifted forward by a fixed amount of bytes on the byte stream and (b) marking cut-off points of detected data chunks based on maximum values within and outside the primary window. A method may output the cut-off points of the detected data chunks.

19 Claims, 6 Drawing Sheets

SYSTEMS AND METHODS FOR EXECUTING JUMP-BASED CONTENT-DEFINED DATA CHUNKING

FIELD OF TECHNOLOGY

The present disclosure relates to the field of data storage and deduplication, and, more specifically, to systems and methods for executing jump-based content-defined data chunking.

BACKGROUND

Data deduplication plays a crucial role in backup systems. It optimizes both storage and bandwidth in said systems by eliminating redundant data. The efficiency of deduplication is significantly low when performed on whole files because any small change between two files can cause them to be treated as different files. Hence, files are usually divided into smaller pieces called chunks. Fixed size chunking is considered the simplest way of dividing files. However, it suffers from a boundary-shift problem, where any addition or removal of the file contents can change all subsequent chunks' boundaries. This lowers the deduplication efficiency.

Content-defined chunking (CDC) techniques addresses this problem by inserting chunk boundaries based on data attributes rather than relying on a predefined size. This approach achieves better deduplication efficiency, but it is significantly slower compared to fixed-size chunking due to the additional computation overhead needed to find the chunk boundary.

More specifically, conventional CDC techniques often face challenges in achieving a high throughput while maintaining a high deduplication ratio. These limitations can affect the overall efficiency of the deduplication process. In most cases, the file chunking stage tends to be the primary performance bottleneck within most deduplication systems. Accordingly, there exists a need for a new chunking technique that offers a significant increase in chunking speed while maintaining a comparable deduplication ratio to existing CDC techniques.

SUMMARY

In one exemplary aspect, the techniques described herein relate to a method for data chunking, the method including: generating, for a byte stream of data, a primary window and a secondary window that overlaps with the primary window; scanning the byte stream for data chunks using the primary window and the secondary window, wherein the scanning includes: executing, based on minimum values in the secondary window when shifted along the primary window, a jump mechanism in which the primary window and the secondary window are shifted forward by a fixed amount of bytes on the byte stream; and marking cut-off points of detected data chunks based on maximum values within and outside the primary window; and outputting the cut-off points of the detected data chunks.

In some aspects, the techniques described herein relate to a method, wherein executing the jump mechanism includes: identifying, when the secondary window is in a first position on the byte stream, a first minimum value within bytes in the secondary window; sliding the secondary window to a second position on the byte stream; identifying, when the secondary window is in the second position, a second minimum value within bytes in the secondary window; in response to determining that the second minimum value is less than the first minimum value, shifting the primary window by the fixed amount of bytes on the byte stream; and shifting the secondary window to the start of the shifted primary window.

In some aspects, the techniques described herein relate to a method, wherein marking the cut-off points includes: identifying, when the secondary window is in a first position on the byte stream, a first minimum value within bytes in the secondary window; detecting that the secondary window has traversed all bytes in the primary window without detecting a value lower than the first minimum value; identifying a maximum value within the bytes of the primary window; comparing the maximum value to a respective value of each byte ahead of the primary window; and in response to detecting, based on the comparing, a byte with a value greater than the maximum value, marking the byte as a cut-off point of a respective data chunk.

In some aspects, the techniques described herein relate to a method, wherein the primary window is of a first size and the secondary window is of a second size, wherein the first size is greater than the second size.

In some aspects, the techniques described herein relate to a method, further including: subsequent to detecting a data chunk by marking a cut-off point, determining an amount of bytes remaining in the byte stream; in response to determining that the amount of bytes is less than the first size plus one byte, identifying the bytes remaining in the byte stream as a last data chunk in the byte stream.

In some aspects, the techniques described herein relate to a method, further including: in response to determining that the amount of bytes is not less than the first size plus one byte, continuing to scan the byte stream for data chunks.

In some aspects, the techniques described herein relate to a method, wherein the secondary window is nested in the primary window.

In some aspects, the techniques described herein relate to a method, further including: identifying a desired throughput value; setting sizes of the primary window, the secondary window, and the fixed amount of bytes of the jump mechanism based on the desired throughput value.

In some aspects, the techniques described herein relate to a method, wherein identifying the desired throughput value includes: determining a size of the byte stream; receiving a threshold period of time to complete the data chunking; and calculating the desired throughput value based on the size of the byte stream and the threshold period of time.

It should be noted that the methods described above may be implemented in a system comprising at least one hardware processor and at least one memory. Alternatively, the methods may be implemented using computer executable instructions of a non-transitory computer readable medium.

In some aspects, the techniques described herein relate to a system for data chunking, including: at least one memory; at least one hardware processor coupled with the at least one memory and configured, individually or in combination, to: generate, for a byte stream of data, a primary window and a secondary window that overlaps with the primary window; scan the byte stream for data chunks using the primary window and the secondary window, wherein the scanning includes: executing, based on minimum values in the secondary window when shifted along the primary window, a jump mechanism in which the primary window and the secondary window are shifted forward by a fixed amount of bytes on the byte stream; and marking cut-off points of detected data chunks based on maximum values within and outside the primary window; and output the cut-off points of the detected data chunks.

In some aspects, the techniques described herein relate to a non-transitory computer readable medium storing thereon computer executable instructions for data chunking, including instructions for: generating, for a byte stream of data, a primary window and a secondary window that overlaps with the primary window; scanning the byte stream for data chunks using the primary window and the secondary window, wherein the scanning includes: executing, based on minimum values in the secondary window when shifted along the primary window, a jump mechanism in which the primary window and the secondary window are shifted forward by a fixed amount of bytes on the byte stream; and marking cut-off points of detected data chunks based on maximum values within and outside the primary window; and outputting the cut-off points of the detected data chunks.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for executing jump-based content-defined data chunking. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure introduces a new chunking technique that achieves higher chunking throughputs compared to conventional chunking techniques described previously. At a high-level, this enhanced throughput is achieved by skipping certain parts of a given file rather than conducting a byte-by-byte scan to determine a cut point. This novel skipping mechanism allows the new technique to outperform all other state-of-the-art methods while maintaining a high deduplication ratio.

Most CDC techniques employ a sliding window approach over a data stream to determine chunk boundaries. For example, in the Rabin Hash technique, which is a rolling hash function that is calculated over a byte stream, if the hash value of the bytes inside the window matches a predefined fingerprint, a boundary is inserted. Other approaches like the asymmetric extreme (AE) technique and the Rapid Asymmetric Maximum (RAM) technique attempt to expedite the process by omitting out hash calculation, and instead, use extreme values of bytes to determine the location of the boundary. These techniques have superior performance compared to hash-based techniques like Rabin Hash. However, there is still room for improvement. Each of these techniques, although faster than their predecessors, continues to fundamentally rely on a byte-by-byte scanning approach, which limits their throughput potential. There is a clear need for more optimization, particularly in enhancing throughput without decreasing the deduplication ratio.

The proposed systems and methods go beyond the byte-by-byte scan approach by skipping certain parts of the byte stream in a deterministic way, which significantly enhances chunking throughput while maintaining a high deduplication ratio.

Figure 1:
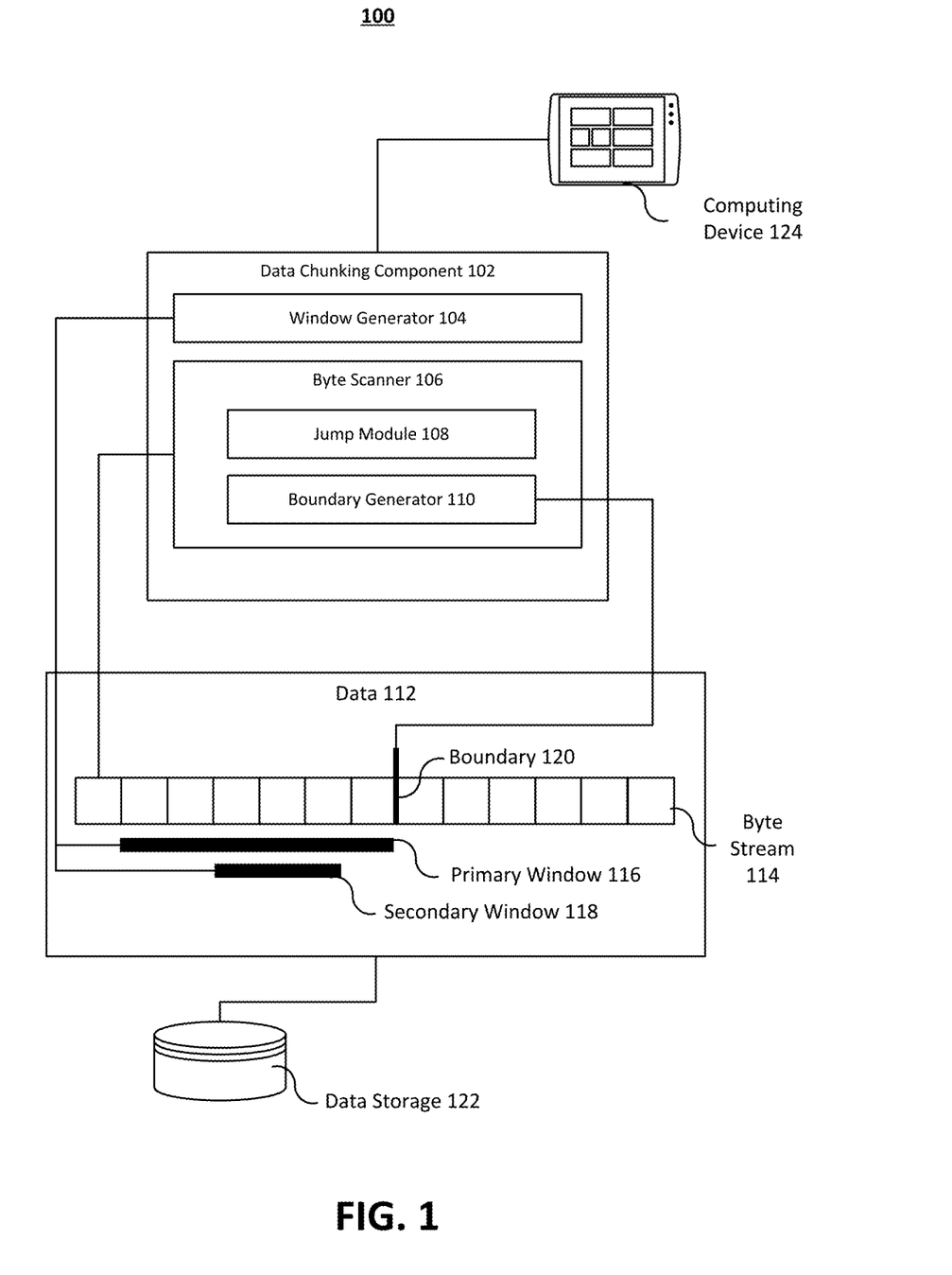
FIG. 1 is a block diagram illustrating a system for executing jump-based content-defined data chunking.

FIG. 1 is a block diagram illustrating system 100 for executing jump-based content-defined data chunking. System 100 includes a data chunking component 102, which may be an application installed on a computing device 124 (e.g., computer system 20 of FIG. 4).

In some aspects, data chunking component 102 may be installed on the same computing device on which data that needs chunking is stored. For example, data chunking component 102 may perform chunking on data 112, which is stored on data storage 122 connected to computing device 124.

In some aspects, data chunking component 102 may be installed on a different computing device such as a remote server. For example, data storage 122 may upload data 112 to the remote server, from where data chunking component 102 may perform chunking. In this case, data chunking component 102 may transmit boundary information to data storage 122.

Data chunking component 102 includes a plurality of modules, namely, window generator 104, byte scanner 106, jump module 108, and boundary generator 110. To find a chunk boundary given a byte stream 114 of data 112, data chunking component 102 follows various steps.

First, window generator 104 creates windows. The proposed chunking technique employs two tiers of windows. In an exemplary aspect, window generator 104 is configured to generate primary window 116 and secondary window 118. Primary window 116 has a size W; secondary window 118 has a size S and is nested within primary window 116. In an exemplary aspects, size W is larger than size S. In an exemplary aspect, secondary window 118 (also referred to as sub-window in the present disclosure) completely overlaps with primary window 116. In other words, no portion of secondary window 118 extends beyond primary window 116.

In some aspects, window generator 104 determines sizes W and S based on the size of the byte stream 114. For example, a longer byte stream 114 may need larger window sizes, whereas a shorter byte stream 114 may need shorter window sizes. Accordingly, the sizes of W and/or S may be a function of a length of byte stream 114. In some aspects, the size of S is set by window generator 104 based on the size of W. For example, size S may be half or one third of size W.

Byte scanner 106 uses primary window 116 and secondary window 118 to scan byte stream 114. In an exemplary aspect, byte scanner 106 places the primary window 116 and secondary window 118 at the beginning of byte stream 114 (e.g., starting from the first byte). Byte scanner 106 then scans the bytes in secondary window 118 to identify a first byte with the lowest value (i.e., the minimum value byte).

Byte scanner 106 then slides the secondary window 118 by S bytes and finds a second byte with the lowest value within secondary window 118. Jump module 108 compares the byte values of the first byte and the second byte. If the value of the second byte is greater than the value of the first byte, byte scanner slides secondary window 118 again by S bytes within primary window 116. The objective is to find the minimum value in each slid secondary window 118 and compare said minimum value with the value of the first byte.

If the minimum value (e.g., of the second byte) is lower than or equal to the value of the first byte, jump module 108 moves the location of both windows forward by J bytes. This jump allows the technique to skip portions of byte stream 114, thereby enhancing chunking throughput.

In some aspects, the value of J is larger than the size of primary window 116 so that a number of bytes may be skipped and throughput can be increased. In some aspects, the value of J may be proportional to the size of primary window 116 and/or secondary window 118 (e.g., twice the size, thrice the size, etc.).

In some aspects, a user may select a particular throughout value for data chunking and data chunking component 102 may size W, S, and J in order to achieve the desired throughput. For example, the user may want byte stream 114 of size A to be chunked within a threshold period of time T. Here, the throughput is given by TP=A/T.

In order to achieve this throughput TP, window generator 104 may set the primary window size as W, the secondary window size as S, and the jump size as J. In some aspects, W, S, J are functions of A and T. For example, W may be equal to A/(M*T), S may be equal to A/(N*T), and J may be equal to W+S, where M and N are adjustable factors. In some aspects, N is larger than M to ensure that S is less than W.

Suppose that jump module 108 determines that the value of the second byte is not lower than or equal to the value of the first byte, and slides secondary window 118 within primary window 116. Suppose that secondary window 118 eventually traverses the entirety of primary window 116 without satisfying the jump condition (i.e., not other byte value less than the value of the first byte is found), byte scanner 106 identifies the maximum byte value in primary window 116. Byte scanner 106 then begins scanning bytes in byte stream 114 that are beyond primary window 116. In an exemplary aspect, byte scanner 106 searches for a byte value that is greater than or equal to the maximum byte value in primary window 116. In response to detecting a byte beyond primary window 116 with a value greater than the maximum byte value, boundary generator 110 marks the byte as a boundary (e.g., a cut-off point for a chunk).

In an exemplary aspect, after each jump or identification of a cut-off point, the entire process is repeated with the new portion of byte stream 114. For example, primary window 116 and secondary window 118 are placed starting from the next byte after the cut-off point or are slid by J bytes as part of the jump condition. The identification of the minimum byte value in secondary window 118 begins again.

Data chunking component 102 ultimately partitions byte stream 114 into chunks defined by cut-off points. These chunks are optimized for deduplication, as they are based on the content-defined principle, but now with higher throughput due to the skipping mechanism. Thus, the technique introduces novel features (primarily its unique skipping mechanism and the dual-window structure) that set it apart from existing technologies.

Traditional CDC methods scan the data byte by byte to determine chunk boundaries, which is computationally intensive and can limit throughput. The proposed method introduces a novel skipping mechanism. When the jump condition is satisfied, the technique jumps ahead by a defined number of bytes, effectively skipping over parts of the data. This approach accelerates chunking while also maintains a high deduplication ratio, addressing a key limitation of existing technologies.

Another significant innovation is the use of two windows for scanning the byte stream: a larger primary window and a smaller sub-window within it. This primary window is similar to the one used in traditional chunking techniques. While the secondary one is used to determine the jump condition.

These innovations represent a significant advancement in content-defined chunking. By significantly enhancing throughput and maintaining high deduplication ratios, this method can effectively address the persistent issue of file chunking being the bottleneck in deduplication systems.

Figure 2:
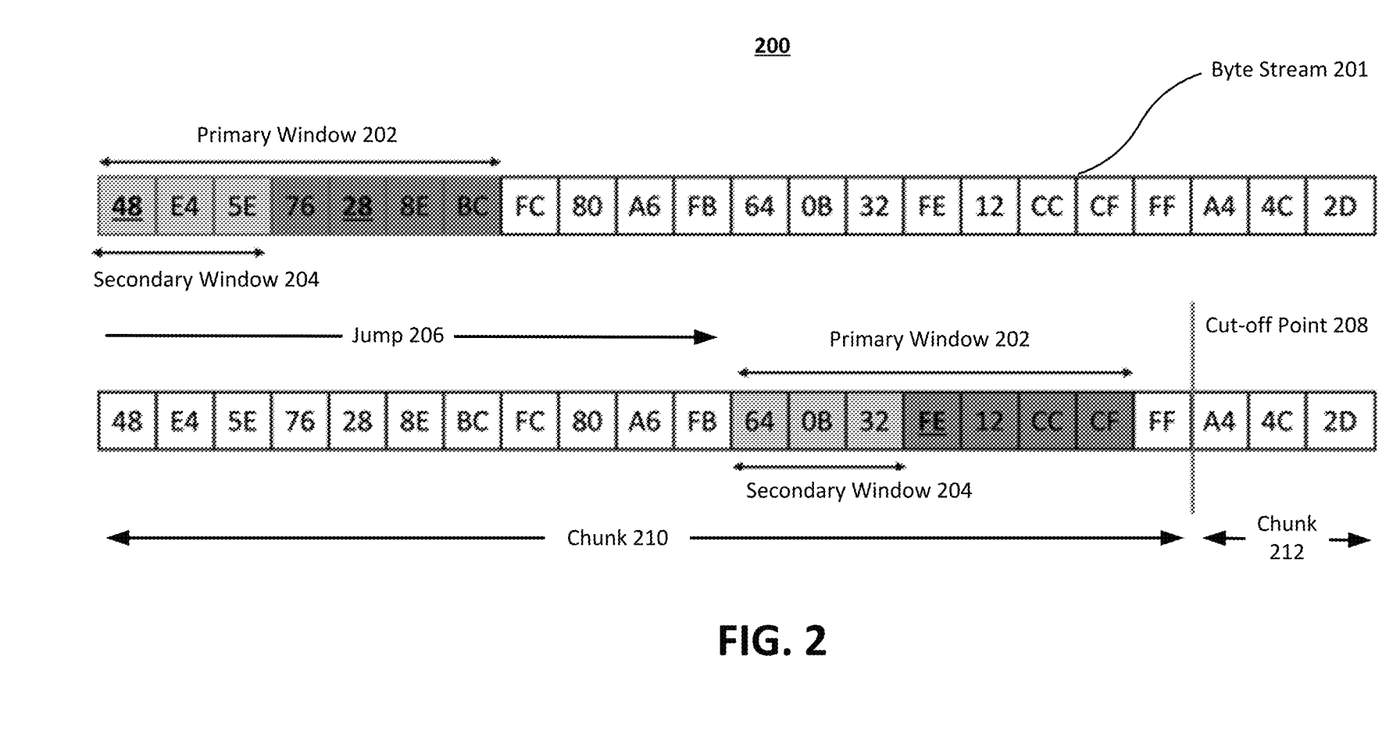
FIG. 2 is a diagram illustrating an example of jump-based content-defined data chunking.

FIG. 2 is a diagram illustrating an example 200 of jump-based content-defined data chunking. Example 200 depicts a 22-byte portion of a byte stream 201. Each byte includes a two-digit hexadecimal value. Window generator 104 generates primary window 202 with a length of 7 bytes and secondary window 204 with a length of 3 bytes.

In example 200, both primary window 202 and secondary window 204 are placed at the start of byte stream 201. Byte scanner 106 scans secondary window 204 for the byte with the lowest value. In this case, the first byte has the lowest value (e.g., 48). Byte scanner 106 then slides secondary window 204 to the next three bytes in primary window 202 and identifies the lowest byte value. The lowest value in the slid secondary window 204 is the fifth byte (e.g., 28). In response to determining that the lowest value in the slid secondary window 204 is less than or equal to the lowest value in the original secondary window 204, jump module 108 shifts primary window 202 in jump 206. Jump 206 is a shift of 11 bytes (i.e., half of the portion shown in byte stream 201). Secondary window 204 is moved to the start of slid primary window 202.

After jump 206, the process restarts. Byte scanner 106 identifies the lowest value in secondary window 204 (e.g., 0B). Secondary window 204 is then moved forward three bytes and the lowest value in the slid secondary window 204 is determined (e.g., 12). Because the value of 12 is not less than or equal to 0B, byte scanner 106 slides secondary window 204 again. In this case, secondary window 204 reaches the end of primary window 202. Because the lowest value remains 0B and the entire primary window 202 has been traversed, byte scanner 106 identifies the highest value in primary window 202 (i.e., FE). Byte scanner 106 then begins to scan each of the bytes past primary window 202 to identify a byte with a higher value than FE. In example 200, the first byte outside of primary window 202 (i.e., FF) has a higher value than FE. In response to detecting the higher value, boundary generator 110 places cut-off point 208 at the byte.

If byte stream 201 had additional bytes, the process of sliding primary window 202 and secondary window 204 to detect additional chunks would proceed. For example, byte scanner 106 may slide primary window 202 and secondary window 204 to start right after cut-off point 208. However, if the amount of bytes remaining in byte stream 201 is less than the size of primary window 202 plus 1 byte, byte scanner 106 may end the chunking process. In this case, the remaining bytes are consider a chunk. If the amount of remaining bytes exceeds the size of primary window 202 plus 1 byte, it is possible that there are may be more than one chunk remaining in byte stream 201. As shown in example 200, chunk 210 extends from the first byte to cut-off point 208. Boundary generator 110 automatically classifies the last three bytes as part of a chunk 212. It should be noted that jump 206 improves the throughput of data chunking because four bytes in example 200 are skipped entirely.

Figure 3:
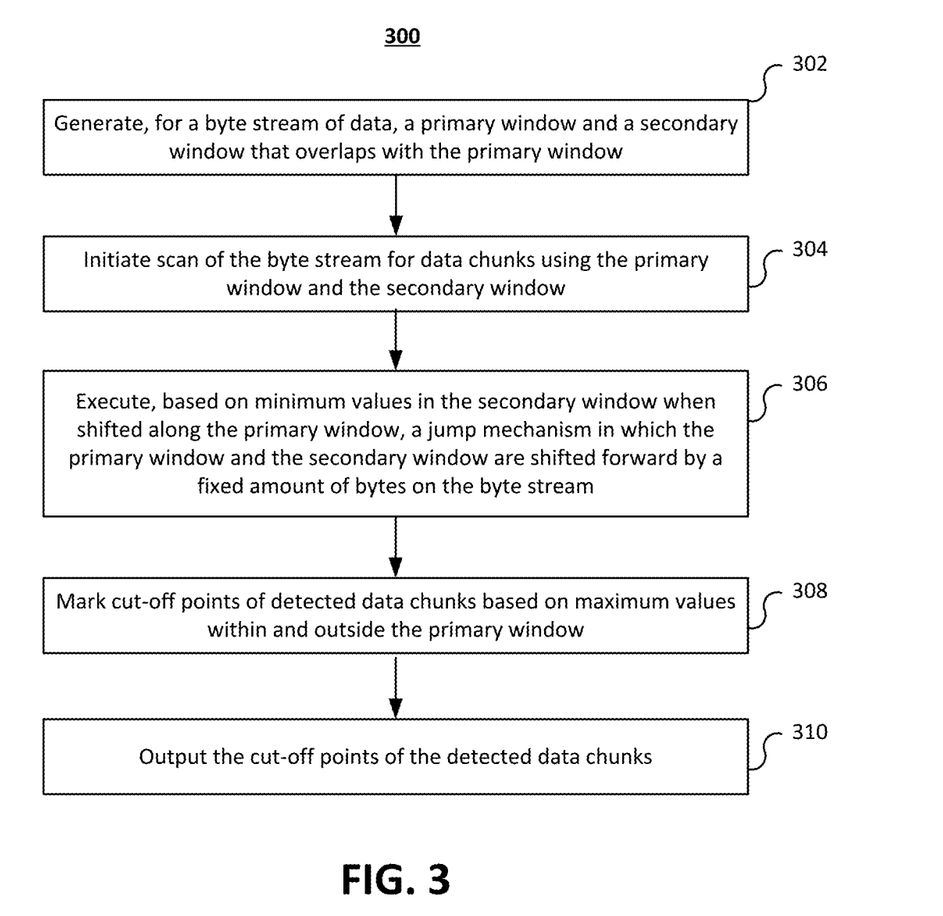
FIG. 3 illustrates a flow diagram of a method for executing jump-based content-defined data chunking.

FIG. 3 illustrates a flow diagram of method 300 for executing jump-based content-defined data chunking. At 302, data chunking component 102 generates, for byte stream 114 of data 112, a primary window 116 and a secondary window 118 that overlaps with the primary window 116. In some aspects, the secondary window 118 is nested in the primary window 116. In some aspects, the primary window 116 is of a first size and the secondary window 118 is of a second size, wherein the first size is greater than the second size.

At 304, data chunking component 102 initiates scans of the byte stream 114 for data chunks using the primary window 116 and the secondary window 118.

At 306, data chunking component 102 executes, based on minimum values in the secondary window 118 when shifted along the primary window 116, a jump mechanism in which the primary window 116 and the secondary window 118 are shifted forward by a fixed amount of bytes on the byte stream 114. In some aspects, data chunking component 102 may identify a desired throughput value. For example, data chunking component 102 may determine a size of the byte stream 114, receive a threshold period of time to complete the data chunking, and calculate the desired throughput value based on the size of the byte stream and the threshold period of time. Data chunking component 102 may then set the sizes of the primary window 116, the secondary window 118, and the fixed amount of bytes of the jump mechanism based on the desired throughput value.

At 308, data chunking component 102 marks cut-off points of detected data chunks based on maximum values within and outside the primary window.

At 310, data chunking component 102 outputs the cut-off points of the detected data chunks.

Figure 4:
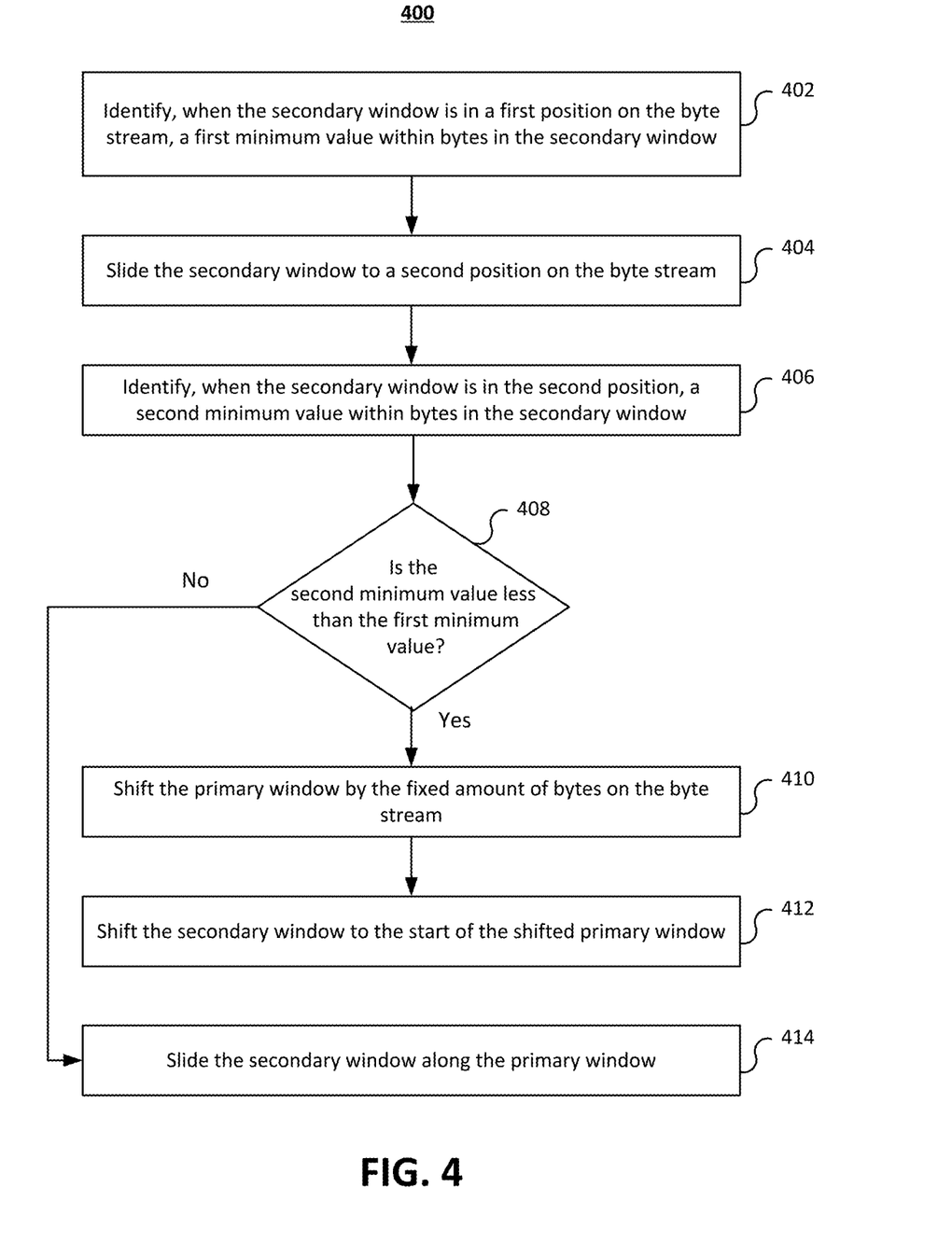
FIG. 4 illustrates a flow diagram of a method for executing a jump mechanism.

FIG. 4 illustrates a flow diagram of method 400 for executing a jump mechanism. At 402, data chunking component 102 identifies, when the secondary window 118 is in a first position on the byte stream 114, a first minimum value within bytes in the secondary window 118. At 404, data chunking component 102 slides the secondary window 118 to a second position on the byte stream 114. At 406, data chunking component 102 identifies, when the secondary window 118 is in the second position, a second minimum value within bytes in the secondary window 118.

At 408, data chunking component 102 determines whether the second minimum value is less than the first minimum value. In response to determining that the second minimum value is less than the first minimum value, at 410, data chunking component 102 shifts the primary window 116 by the fixed amount of bytes on the byte stream 114. At 412, data chunking component 102 shifts the secondary window to the start of the shifted primary window.

If at 408, data chunking component 102 determines that the second minimum value is not less than the first minimum value, method 400 advances to 414, where data chunking component 102 slides the secondary window 118 along the primary window 116.

Figure 5:
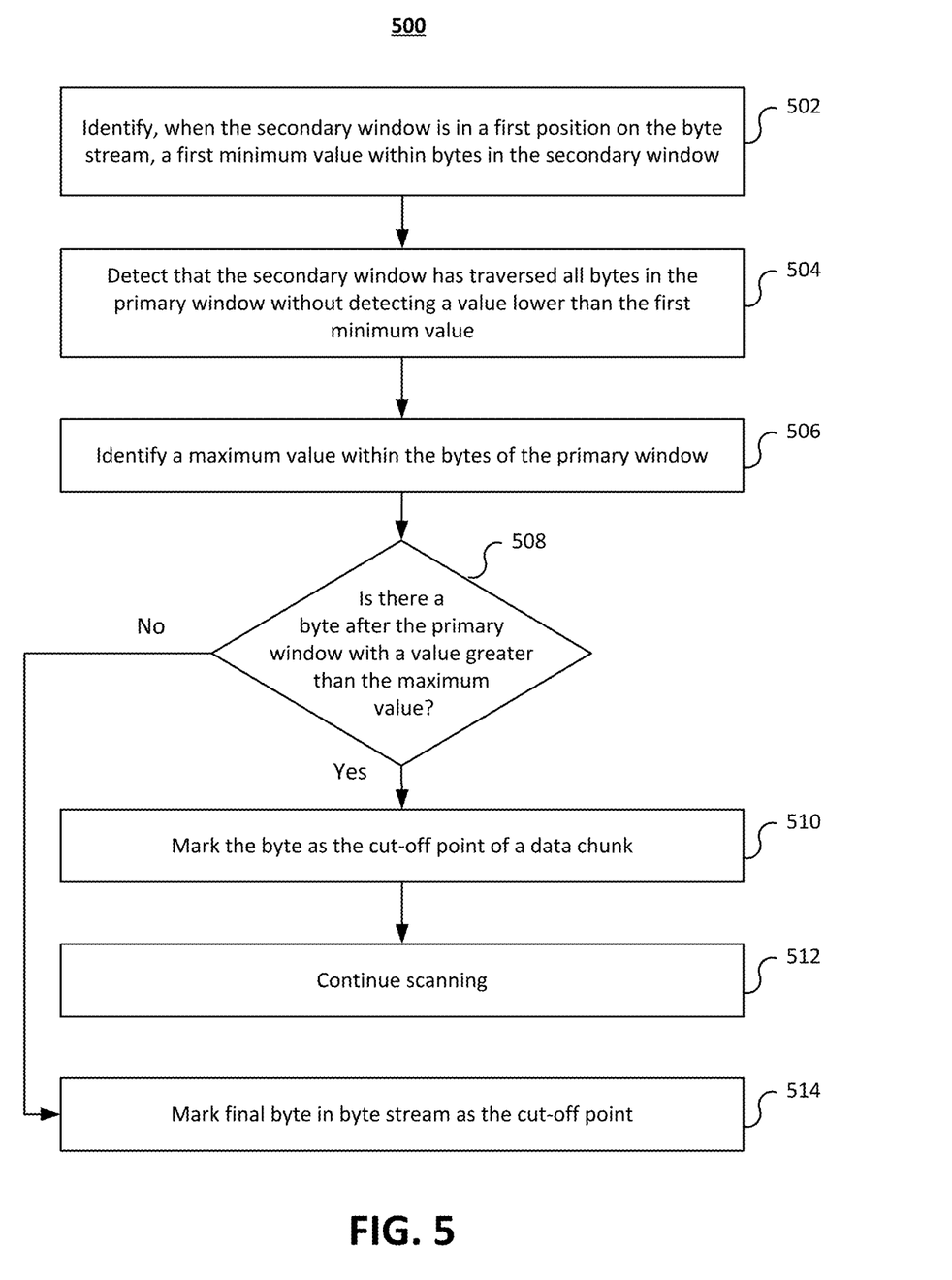
FIG. 5 illustrates a flow diagram of a method for marking a cut-off point of a data chunk.

FIG. 5 illustrates a flow diagram of method 500 for marking a cut-off point of a data chunk. At 502, data chunking component 102 identifies, when the secondary window 118 is in a first position on the byte stream 114, a first minimum value within bytes in the secondary window 118. At 504, data chunking component 102 detects that the secondary window 118 has traversed all bytes in the primary window 116 without detecting a value lower than the first minimum value. At 506, identifies a maximum value within the bytes of the primary window 116. At 508, data chunking component 102 determines whether there is a byte outside and after the primary window 116 with a value greater than the maximum value. In particular, data chunking component 102 compares the maximum value to a respective value of each byte ahead of the primary window 114. In response to detecting, based on the comparing, a byte with a value greater than the maximum value, data chunking component 102 marks the byte as a cut-off point of a respective data chunk at 510. Subsequently at 512, data chunking component 102 continues scanning the byte stream 114. However, if at 508, data chunking component 102 determines that no such byte exists in the remainder of the byte stream 114, data chunking component 102 marks final byte in byte stream as the cut-off point.

In some aspects, at 512, subsequent to detecting a data chunk by marking a cut-off point, data chunking component 102 determines an amount of bytes remaining in the byte stream 114. In response to determining that the amount of bytes is less than the first size plus one byte, data chunking component 102 identifies the bytes remaining in the byte stream 114 as a last data chunk in the byte stream 114 (e.g., data chunk 212), and scanning ceases. However, in response to determining that the amount of bytes is not less than the first size plus one byte, data chunking component 102 continues to scan the byte stream 114 for data chunks.

Figure 6:
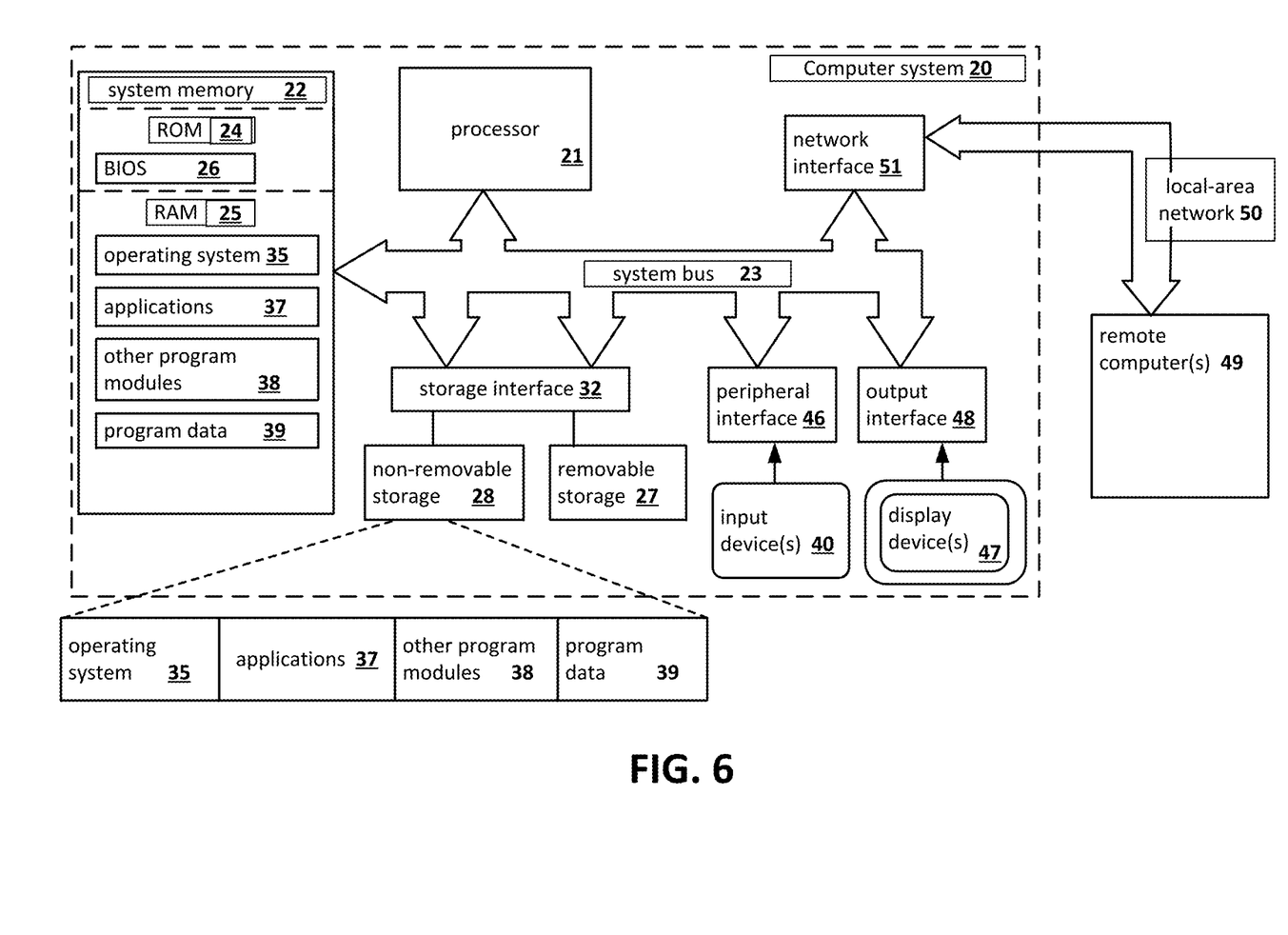
FIG. 6 presents an example of a general-purpose computer system on which aspects of the present disclosure can be implemented.

FIG. 6 is a block diagram illustrating a computer system 20 on which aspects of systems and methods for executing jump-based content-defined data chunking may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-5 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for data chunking, the method comprising:
generating, for a byte stream of data, a primary window and a secondary window that overlaps with the primary window;
scanning the byte stream for data chunks using the primary window and the secondary window, wherein the scanning comprises:
executing, based on minimum values in the secondary window when shifted along the primary window, a jump mechanism in which the primary window and the secondary window are shifted forward by a fixed amount of bytes on the byte stream; and
marking cut-off points of detected data chunks based on maximum values within and outside the primary window; and
outputting the cut-off points of the detected data chunks.

2. The method of claim 1, wherein executing the jump mechanism comprises:
identifying, when the secondary window is in a first position on the byte stream, a first minimum value within bytes in the secondary window;
sliding the secondary window to a second position on the byte stream;
identifying, when the secondary window is in the second position, a second minimum value within bytes in the secondary window;
in response to determining that the second minimum value is less than the first minimum value, shifting the primary window by the fixed amount of bytes on the byte stream; and
shifting the secondary window to the start of the shifted primary window.

3. The method of claim 1, wherein marking the cut-off points comprises:
identifying, when the secondary window is in a first position on the byte stream, a first minimum value within bytes in the secondary window;
detecting that the secondary window has traversed all bytes in the primary window without detecting a value lower than the first minimum value;
identifying a maximum value within the bytes of the primary window;
comparing the maximum value to a respective value of each byte ahead of the primary window; and
in response to detecting, based on the comparing, a byte with a value greater than the maximum value, marking the byte as a cut-off point of a respective data chunk.

4. The method of claim 1, wherein the primary window is of a first size and the secondary window is of a second size, wherein the first size is greater than the second size.

5. The method of claim 4, further comprising:
subsequent to detecting a data chunk by marking a cut-off point, determining an amount of bytes remaining in the byte stream;
in response to determining that the amount of bytes is less than the first size plus one byte, identifying the bytes remaining in the byte stream as a last data chunk in the byte stream.

6. The method of claim 5, further comprising:
in response to determining that the amount of bytes is not less than the first size plus one byte, continuing to scan the byte stream for data chunks.

7. The method of claim 1, wherein the secondary window is nested in the primary window.

8. The method of claim 1, further comprising:
identifying a desired throughput value;
setting sizes of the primary window, the secondary window, and the fixed amount of bytes of the jump mechanism based on the desired throughput value.

9. The method of claim 8, wherein identifying the desired throughput value comprises:
determining a size of the byte stream;
receiving a threshold period of time to complete the data chunking; and
calculating the desired throughput value based on the size of the byte stream and the threshold period of time.

10. A system for data chunking, comprising:
at least one memory;
at least one hardware processor coupled with the at least one memory and configured, individually or in combination, to:

generate, for a byte stream of data, a primary window and a secondary window that overlaps with the primary window;

scan the byte stream for data chunks using the primary window and the secondary window, wherein the scanning comprises:

executing, based on minimum values in the secondary window when shifted along the primary window, a jump mechanism in which the primary window and the secondary window are shifted forward by a fixed amount of bytes on the byte stream; and marking cut-off points of detected data chunks based on maximum values within and outside the primary window; and output the cut-off points of the detected data chunks.

11. The system of claim 10, wherein the at least one hardware processor is configured to execute the jump mechanism by:

identifying, when the secondary window is in a first position on the byte stream, a first minimum value within bytes in the secondary window;

sliding the secondary window to a second position on the byte stream;

identifying, when the secondary window is in the second position, a second minimum value within bytes in the secondary window;

in response to determining that the second minimum value is less than the first minimum value, shifting the primary window by the fixed amount of bytes on the byte stream; and shifting the secondary window to the start of the shifted primary window.

12. The system of claim 10, wherein the at least one hardware processor is configured to mark the cut-off points by:

identifying, when the secondary window is in a first position on the byte stream, a first minimum value within bytes in the secondary window;

detecting that the secondary window has traversed all bytes in the primary window without detecting a value lower than the first minimum value;

identifying a maximum value within the bytes of the primary window;

comparing the maximum value to a respective value of each byte ahead of the primary window; and in response to detecting, based on the comparing, a byte with a value greater than the maximum value, marking the byte as a cut-off point of a respective data chunk.

13. The system of claim 10, wherein the primary window is of a first size and the secondary window is of a second size, wherein the first size is greater than the second size.

14. The system of claim 13, wherein the at least one hardware processor is configured to:

subsequent to detecting a data chunk by marking a cut-off point, determine an amount of bytes remaining in the byte stream;

in response to determining that the amount of bytes is less than the first size plus one byte, identify the bytes remaining in the byte stream as a last data chunk in the byte stream.

15. The system of claim 14, wherein the at least one hardware processor is configured to:

in response to determining that the amount of bytes is not less than the first size plus one byte, continue to scan the byte stream for data chunks.

16. The system of claim 10, wherein the secondary window is nested in the primary window.

17. The system of claim 10, wherein the at least one hardware processor is configured to:

identify a desired throughput value;

set sizes of the primary window, the secondary window, and the fixed amount of bytes of the jump mechanism based on the desired throughput value.

18. The system of claim 17, wherein the at least one hardware processor is configured to identify the desired throughput value by:

determining a size of the byte stream;

receiving a threshold period of time to complete the data chunking; and calculating the desired throughput value based on the size of the byte stream and the threshold period of time.

19. A non-transitory computer readable medium storing thereon computer executable instructions for data chunking, including instructions for:

generating, for a byte stream of data, a primary window and a secondary window that overlaps with the primary window;

scanning the byte stream for data chunks using the primary window and the secondary window, wherein the scanning comprises:

executing, based on minimum values in the secondary window when shifted along the primary window, a jump mechanism in which the primary window and the secondary window are shifted forward by a fixed amount of bytes on the byte stream; and marking cut-off points of detected data chunks based on maximum values within and outside the primary window; and outputting the cut-off points of the detected data chunks.

* * * * *